United States Patent

[11] 3,619,152

| [72] | Inventors | Stanley A. Yalof<br>Escondido;<br>Ray T. Williams, San Diego, both of Calif. |
|---|---|---|
| [21] | Appl. No. | 858,265 |
| [22] | Filed | Sept. 16, 1969 |
| [45] | Patented | Nov. 9, 1971 |
| [73] | Assignee | Tetrahedron Associates<br>San Diego, Calif. |

[54] CUTTING TOOL WITH BORON FILAMENT COMPOSITE
6 Claims, 6 Drawing Figs.

[52] U.S. Cl. .................................................. 51/309,
51/295, 51/298, 51/307, 51/206, 125/15
[51] Int. Cl. .................................................. C04b 31/16
[50] Field of Search .......................................... 51/206,
307, 309; 125/15

[56] References Cited
UNITED STATES PATENTS

| 792,050 | 6/1905 | King ............................ | 51/206 |
| 2,763,105 | 9/1956 | Felley .......................... | 51/206 UX |
| 3,431,687 | 3/1969 | Fischer ........................ | 51/206 |
| 3,081,161 | 3/1963 | Cantrell ....................... | 51/309 X |
| 3,353,526 | 11/1967 | Daem ........................... | 51/206 X |
| 3,136,615 | 6/1964 | Bovenkerk .................... | 51/309 X |

*Primary Examiner*—Harold D. Whitehead
*Attorney*—Richard K. MacNeill

ABSTRACT: A cutting tool comprising a support body with a boron filament composite cutting edge.

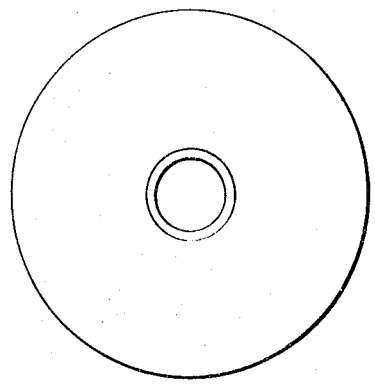
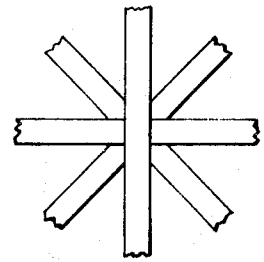
Fig. 1a     Fig. 1b     Fig. 1c
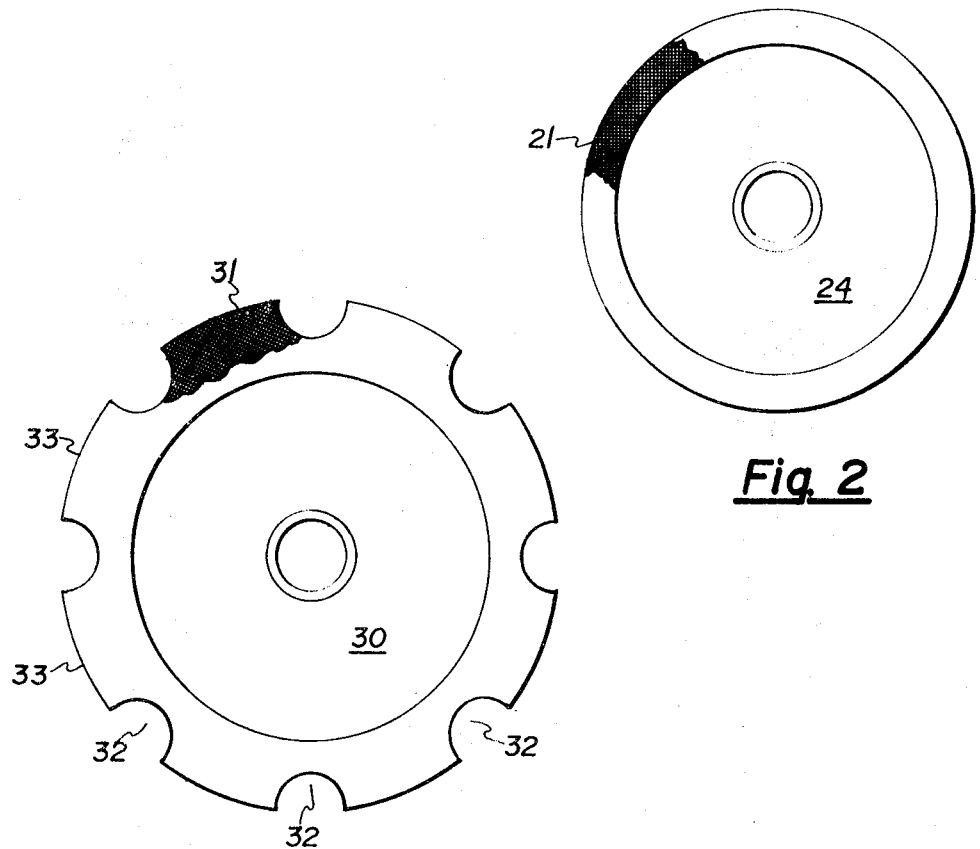
Fig. 2
Fig. 3
INVENTOR.
RAY T. WILLIAMS
BY STANLEY A. YALOF
Richard K. Macneill

CUTTING TOOL WITH BORON FILAMENT COMPOSITE

BACKGROUND OF THE INVENTION

The invention relates generally to the art of saw making and particularly to saw blades used in cutting concrete and asphalt aggregates by means of cutting surfaces formed from boron composites. Prior art saws utilize cutting surfaces formed of diamond or carbide which result in efficient, but expensive tools. The manufacture of lower cost, yet efficient, saw blades and other cutting tools is desirable. Some cutting performance could be sacrificed if the tools were cost effective.

One example of a prior art diamond charged saw blades is set forth in U.S. Pat. No. 2,408,148, by T. Longbotham.

BRIEF DESCRIPTION OF THE INVENTION

FIGS. 1a, 1b and 1c illustrate one embodiment of the invention using a boron fiberglass composite;

FIG. 2 illustrates another embodiment of the invention using an aluminum or fiberglass mandrel and a boron composite insert;

FIG. 3 illustrates a variant of FIG. 2; and

DESCRIPTION OF THE PREFERRED EMBODIMENTS

Figure 4:
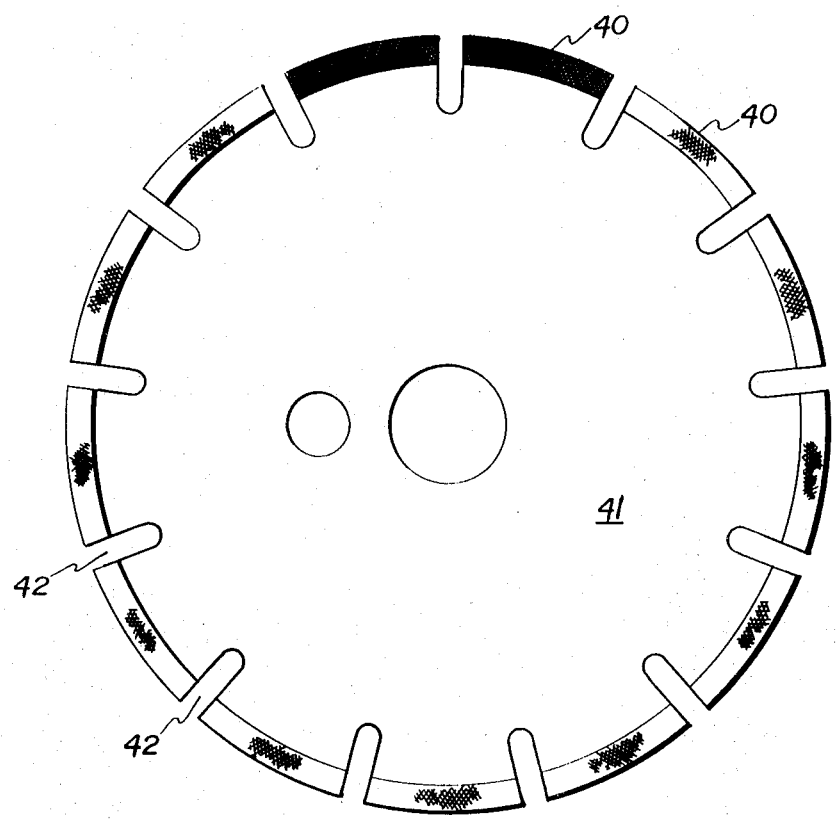
FIG. 4 illustrates another embodiment of the invention utilizing a scalloped mandrel and and boron composite inserts.

The saw blade illustrated in FIGS. 1a and 1b was formed from 3-inch wide boron epoxy composite tape. The tape incorporates boron filaments in an epoxy matrix wherein the filaments run longitudinally in the tape. Other resins, such as polyimides and phenolics could be used for the matrix instead of epoxy. Twenty-five layers of tape were used and the layers were oriented, as shown in FIG. 1c. Orienting the individual layers results in a high strength laminated structure.

The resulting structure was cured at 320° F. for 2 hours at 75 p.s.i. in a press using a pancake mold.

In use, the saw blade is mounted on a motor driven arbor and the periphery of the blade is pressed against the article to be cut. In cutting concrete or flagstone, a speed up to 2,600 r.p.m., or 4,766 s.f.m., is used. In order to cool the blade and thereby prevent epoxy burnout, a water flush or spray is directed onto the cutting edge of the blade. The wear rate under these conditions is about 0.125 inch of the diameter per 4-8 feet of cut.

FIG. 2 illustrates a saw blade comprising an aluminum or fiberglass mandrel 20 with a boron composite cutting insert 21 around the periphery thereof. The insert may be a chopped boron filament in an epoxy matrix, chopped boron filament in a carbide matrix, or chopped boron filament in a metal matrix. Also, boron crystals or granular amorphous boron, or a combination of these, may be substituted for the chopped boron filament.

In order to improve blade cooling and thereby increase the cutting speed, a blade configured, as shown in FIG. 3, may be used. There, an aluminum or fiberglass mandrel has mounted on its rim a boron composite cutting edge 31 similar to that used in the embodiment of FIG. 2. However, the cutting edge 31 of the blade set forth in FIG. 3 differs over the cutting edge shown in FIG. 2 in being scalloped or undercut as at 32, thereby leaving alternating raised and undercut portions 33 and 32, respectively.

The cutting edge, comprising chopped filament boron in an epoxy matrix, is adhesively bonded to the fiberglass or aluminum mandrel.

In the embodiment illustrated in FIG. 4, cutting inserts 40 are attached to a steel mandrel 41. The cutting inserts 40 comprise chopped boron filament in a metal matrix, carbide matrix or ceramic matrix.

For instance, boron filament is chopped into ⅛ inch random lengths using a mortar and pestle. The chopped fibers are then combined with a mix of silicon and tungsten carbide by weight and 40 percent boron. The resultant composition is then pressed and sintered into 0.090 inch-0.100 inch × 0.250 inch × 2 ⅛ inches cutting inserts 40. The inserts 40 are then silver brazed onto a standard 10 inches diameter saw blank, such as 41. The blank 41 is relieved or undercut, as at 42, to provide for increased cooling.

An alternate to the embodiment illustrated in FIG. 4 comprises using amorphous boron which is melted and granulated to 40-60 mesh size. The granules are then combined with a carbide matrix using powder metallurgy techniques. Typical weight percents of the granules range from 15-75 percent of the total weight. The resultant cutting inserts are attached to the saw blank by brazing.

If desired, the boron could be employed in chopped form, or as crystals, or in granular form within the matrix. The matrixes may be organic plastics (such as epoxys, metals (such as aluminum), or various ceramics (such as silicon carbide or magnesium carbide).

We claim:

1. A boron composite tool comprising:
   a supporting body;
   a cutting edge at the outer portion of said body; and
   said cutting edge comprising a boron filament composite.

2. The boron composite cutting tool as set forth in claim 1 wherein:
   said supporting body comprises a mandrel chosen from the class consisting of fiberglass, aluminum and steel.

3. The boron composite cutting tool as set forth in claim 1 wherein:
   said supporting body comprises a boron filament fiberglass matrix composite.

4. The boron composite cutting tool as set forth in claim 2 wherein:
   said mandrel is scalloped evenly about the periphery to form alternating raised and undercut areas; and
   said cutting edge comprises boron composite inserts physically attached to said raised portions of said mandrel.

5. The boron composite cutting tool as set forth in claim 4 wherein:
   said inserts are formed of material chosen from the class consisting of boron monofilament in a metal matrix, boron monofilament in a carbide matrix, boron monofilament in a ceramic matrix, boron crystals in a metal matrix, boron crystals in a carbide matrix and boron crystals in a ceramic matrix, granular amorphous boron in a metal matrix, granular amorphous boron in a carbide matrix and granular amorphous boron in a ceramic matrix.

6. The boron composite cutting tool as set forth in claim 4 wherein:
   said inserts are formed of a boron fiberglass composite and are adhesively secured to said mandrel.

* * * * *

Notice of Adverse Decisions in Interferences

In Interference No. 98,066 involving Patent No. 3,619,152, S. A. Yalof and R. T. Williams, final judgment adverse to the patentee was rendered May 31, 1973, as to claims 1, 2 and 3.

[*Official Gazette September 4, 1973.*]